US011601400B2

(12) United States Patent
Yehudai et al.

(10) Patent No.: US 11,601,400 B2
(45) Date of Patent: *Mar. 7, 2023

(54) AGGREGATING ALERTS OF MALICIOUS EVENTS FOR COMPUTER SECURITY

(71) Applicant: Imperva, Inc., San Mateo, CA (US)

(72) Inventors: Gilad Yehudai, Herzeliya (IL); Itsik Mantin, Shoham (IL); Lior Fisch, Givatayim (IL); Shelly Hershkovitz, Sunnyvale, CA (US); Amichai Shulman, Tel Aviv (IL); Moran Rachel Ambar, Ra'anana (IL)

(73) Assignee: Imperva, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,362

(22) Filed: Nov. 23, 2021

(65) Prior Publication Data
US 2022/0086125 A1    Mar. 17, 2022

Related U.S. Application Data

(63) Continuation of application No. 16/000,779, filed on Jun. 5, 2018, now Pat. No. 11,218,448.

(51) Int. Cl.
*H04L 9/40*   (2022.01)
*G06K 9/62*   (2022.01)

(52) U.S. Cl.
CPC ........ *H04L 63/0263* (2013.01); *G06K 9/6215* (2013.01); *G06K 9/6218* (2013.01); *H04L 63/1416* (2013.01); *H04L 63/1441* (2013.01)

(58) Field of Classification Search
CPC .............. G06K 9/6215; G06K 9/6218; G06K 9/6221; H04L 63/0263; H04L 63/1416; H04L 63/1441

See application file for complete search history.

(56) References Cited

U.S. PATENT DOCUMENTS

| 3,609,703 A * | 9/1971 | Peacock ............... G06F 7/02 |
| | | 707/E17.037 |
| 6,292,093 B1 * | 9/2001 | Su ........................ G06F 7/02 |
| | | 340/146.2 |

(Continued)

OTHER PUBLICATIONS

Adelina, J., et al., "An Efficient Algorithm for Clustering Intrusion Alert," Journal of Theoretical and Applied Information Technology, Mar. 31, 2012, pp. 234-240, vol. 37, No. 2.

(Continued)

*Primary Examiner* — Gary S Gracia
(74) *Attorney, Agent, or Firm* — Nicholson, De Vos, Webster & Elliott, LLP (57) ABSTRACT

A method by a computing device implementing an attack analyzer for processing malicious events. The method includes determining a first set of features describing a malicious event detected by a firewall, determining a set of distances using a non-Euclidean distance function and the first set of features, wherein the non-Euclidean distance function is used to determine geographic origin similarity between different Internet Protocol addresses included in the first and second set of features, generating a statistical distribution object using the set of distances, wherein the statistical distribution object includes information describing a cluster that includes at least the malicious event and one or more other malicious events that are determined to be similar to the malicious event in terms of geographic origin, and transmitting information describing the cluster to a management console for presentation to an administrator on a graphical user interface.

20 Claims, 8 Drawing Sheets

(56) References Cited

U.S. PATENT DOCUMENTS

| | | | | |
|---|---|---|---|---|
| 7,853,632 | B2* | 12/2010 | Ching | G06F 7/575 |
| | | | | 708/232 |
| 9,843,596 | B1* | 12/2017 | Averbuch | G06F 21/554 |
| 10,463,973 | B2* | 11/2019 | Miller | A63F 13/795 |
| 11,425,151 | B2* | 8/2022 | Kaidi | G06K 9/6256 |
| 2004/0025044 | A1* | 2/2004 | Day | H04L 63/1408 |
| | | | | 726/23 |
| 2005/0144203 | A1* | 6/2005 | McCallum | G06F 16/90344 |
| | | | | 708/200 |
| 2014/0096251 | A1* | 4/2014 | Doctor | H04L 63/1441 |
| | | | | 726/23 |
| 2014/0189159 | A1* | 7/2014 | Morris | H04L 61/4511 |
| | | | | 709/245 |
| 2015/0163224 | A1* | 6/2015 | Kim | H04L 67/56 |
| | | | | 726/27 |
| 2016/0092317 | A1* | 3/2016 | Akiyama | G06F 11/0751 |
| | | | | 714/20 |
| 2016/0352906 | A1* | 12/2016 | Jandwani | G06F 16/9535 |
| 2016/0359740 | A1* | 12/2016 | Parandehgheibi | H04L 43/08 |
| 2017/0019312 | A1* | 1/2017 | Meyer | G06N 20/00 |
| 2017/0034160 | A1* | 2/2017 | Brands | H04M 3/56 |
| 2017/0124315 | A1* | 5/2017 | Klevan | G06Q 50/265 |
| 2018/0004803 | A1* | 1/2018 | Hao | G16H 70/20 |
| 2018/0069883 | A1* | 3/2018 | Meshi | G06N 20/00 |
| 2018/0089303 | A1* | 3/2018 | Miller | G06F 16/26 |
| 2018/0174060 | A1* | 6/2018 | Velez-Rojas | G06N 5/02 |

OTHER PUBLICATIONS

Advisory Action Office Action, U.S. Appl. No. 16/000,779, dated Mar. 2, 2021, 3 pages.

Akamai Technologies, Inc., "Improving Web Application Security: The Akamai Approach to WAF," Akamai White Paper, Sep. 2015, 11 Pages.

Aldridge, J., et al., "Focus on What Matters—Prioritizing Security Efforts," FireEye, Issue 2, 2014, 11 Pages.

Bunn, P., et al., "Secure Two-Party k-Means Clustering," CCS '07 Proceedings of the 14th ACM conference on Computerand communications security, 2007, pp. 486-497 (27 Pages).

Colajanni, M., et al., "Machine learning algorithms for clustering and correlating security alerts in Intrusion Detection Systems," Anno Accademico 2009-2010, 94 Pages.

Cole, E., "SOC Automation—Deliverance or Disaster," A SANS Spotlight Paper, SANS Institute, Dec. 2017, pp. 1-5.

Cuppens, F., "Managing Alerts in a Multi-Intrusion Detection Environment," ONERA Toulouse, ACSAC '01 Proceedings of the 17th Annual Computer Security Applications Conference, Dec. 10-14, 2001, 10 Pages.

Final Rejection dated Dec. 9, 2020 for U.S. Appl. No. 16/000,779.

Garriga, G.C., et al., "Strategic Management of Security Information through an Entropy-Based Alert Correlator," European CIIP Newsletter, Publication date unknown, pp. 24-30, [online] [retrieved on Jun. 6, 2018, Retrieved from the internet <URL: http://www.lsi.upc.es/-balqui/alertas.pdf>.

Hidden Markov models for malware classification, J Comput Virol Hack Tech (2015) (Year: 2015).

Humphrey, W., et al., "Using Alert Cluster to reduce IDS Alerts," 3rd International Conference on Computer Science and Information Technology, 2010, pp. 467-471.

Manganiello, F., et al., "Multistep Attack Detection and Alert Correlation in Intrusion Detection Systems," 5th International Conference on Information Security and Assurance (ISA 2011), Aug. 2011, pp. 1-16.

Ning, P., et al., "Techniques and Tools for Analyzing Intrusion Alerts," ACM Journal Name, vol. V, No. N, May 2004, pp. 1-44.

Non-Final Office Action, U.S. Appl. No. 16/000,779, dated Jul. 7, 2020, 20 pages.

Non-Final Office Action, U.S. Appl. No. 16/000,779, dated Mar. 23, 2021, 23 pages.

Notice of Allowance, U.S. Appl. No. 16/000,779, dated Aug. 24, 2021, 11 pages.

Perdisci, R., et al., "Behavioral Clustering of HTTP-Based Malware and Signature Generation Using Malicious Network Traces," NSDI'10 Proceedings of the 7th USENIX conference on Networked systems design and implementation, Apr. 2010, pp. 1-14.

Siraj, M., et al., "Intelligent Alert Clustering Model for Network Intrusion Analysis," Int. J. Advance. Soft Comput. Appl., vol. 1, No. 1, Jul. 2009, 16 Pages.

Siraj, M., et al., "Network Intrusion Alert Aggregation Based on PCA and Expectation Maximization Clustering Algorithm," 2009 International Conference on Computer Engineering and Applications IPCSIT, 2011, pp. 395-399, vol. 2.

Siraj, M., et al., "Towards Predictive Real-time Multi-sensors Intrusion Alert Correlation Framework," Indian Journal of Science and Technology, Jun. 2015, 10 Pages, vol. 8, Is. 12.

Subbulakshmi, T., et al., "Real Time Classification and Clustering of IDS Alerts Using Machine Learning Algorithms," International Journal of Artificial Intelligence & Applications (IJAIA), vol. 1, No. 1, Jan. 2010, pp. 1-9.

Vaarandi, R., et al., "Network IDS Alert Classification with Frequent Itemset Mining and Data Clustering," Proceedings of the 2010 IEEE Conference on Network and Service Management, 2010, 7 Pages.

* cited by examiner

AGGREGATING ALERTS OF MALICIOUS EVENTS FOR COMPUTER SECURITY

CROSS-REFERENCE TO RELATED APPLICATIONS

This application is a continuation of application Ser. No. 16/000,779, filed Jun. 5, 2018, which is hereby incorporated by reference.

FIELD OF DISCLOSURE

This disclosure relates to security in a computing system, and in particular to aggregating alerts of malicious events.

BACKGROUND

Web applications are targets of cyberattacks because they may be accessible entry points into data or servers running web applications. A web application firewall, or any application level security system, may be used to detect or block malicious events such as cyberattacks before unauthorized attacks reach servers. However, the system may generate large volumes of alerts describing detected events, for instance, on the magnitude of thousands to millions per day, which is difficult for a security system or system administrator to manage. Existing methods attempt to aggregate alerts of malicious events include but are not limited to statistical approaches in spatial space or take a Euclidean approach or numerical approach to map relationships such as physical distances between origin geographical locations of malicious events. Other existing methods may group alerts based on one or more specific attribute(s). However, these approaches may not capture certain useful features or relationships between various types of malicious events. For example, features such as internet protocol (IP) addresses may be useful for determining sources of cyberattacks, but IP addresses do not have a natural way to be embedded into a spatial space or numerical space. Moreover, these methods may be based on an initial set of known data or attacks, but may not be able to adapt as new information or attack is processed by the system.

SUMMARY

An application level security system, or an attack analyzer, e.g., as part of a protection system, aggregates alerts of malicious events in a network infrastructure. The attack analyzer maintains statistical distribution objects that describe clusters of alerts of malicious events previously detected by a firewall. The clusters group alerts that are similar based on one or more features of the malicious events such as origin of an attack, target of an attack, and type of tool used for the attack, etc. Upon analysis of a newly detected malicious event, the attack analyzer may extract features from the malicious event. Additionally, the attack analyzer can use distance functions, such as Euclidean or non-Euclidean distance functions, to compare the extracted features with those of the clusters of previously detected malicious events. Conventional methods may use Euclidean distance functions to determine only quantitative or numerical distances between two points. However, Euclidean distance functions may not be used to determine, or meaningfully determine, qualitative or non-numerical relationships between multiple types of features of malicious events. Non-Euclidean distance functions provide a qualitative approach to determine relationships between events that can be based on different features, characteristics, actual data observed, domain knowledge, or mappings to distance functions. Based on the comparison, the attack analyzer may update the statistical distribution objects by adding a new alert of the malicious event to an existing cluster, generating a new cluster including the new alert, or splitting an existing cluster into two or more clusters. The attack analyzer may process new alerts in either a batch mode (e.g., accumulating a threshold number of new alerts before updating the clusters) or in a streaming mode (e.g., processing alerts one at a time as the malicious events are detected).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Example System Overview

Figure 1:
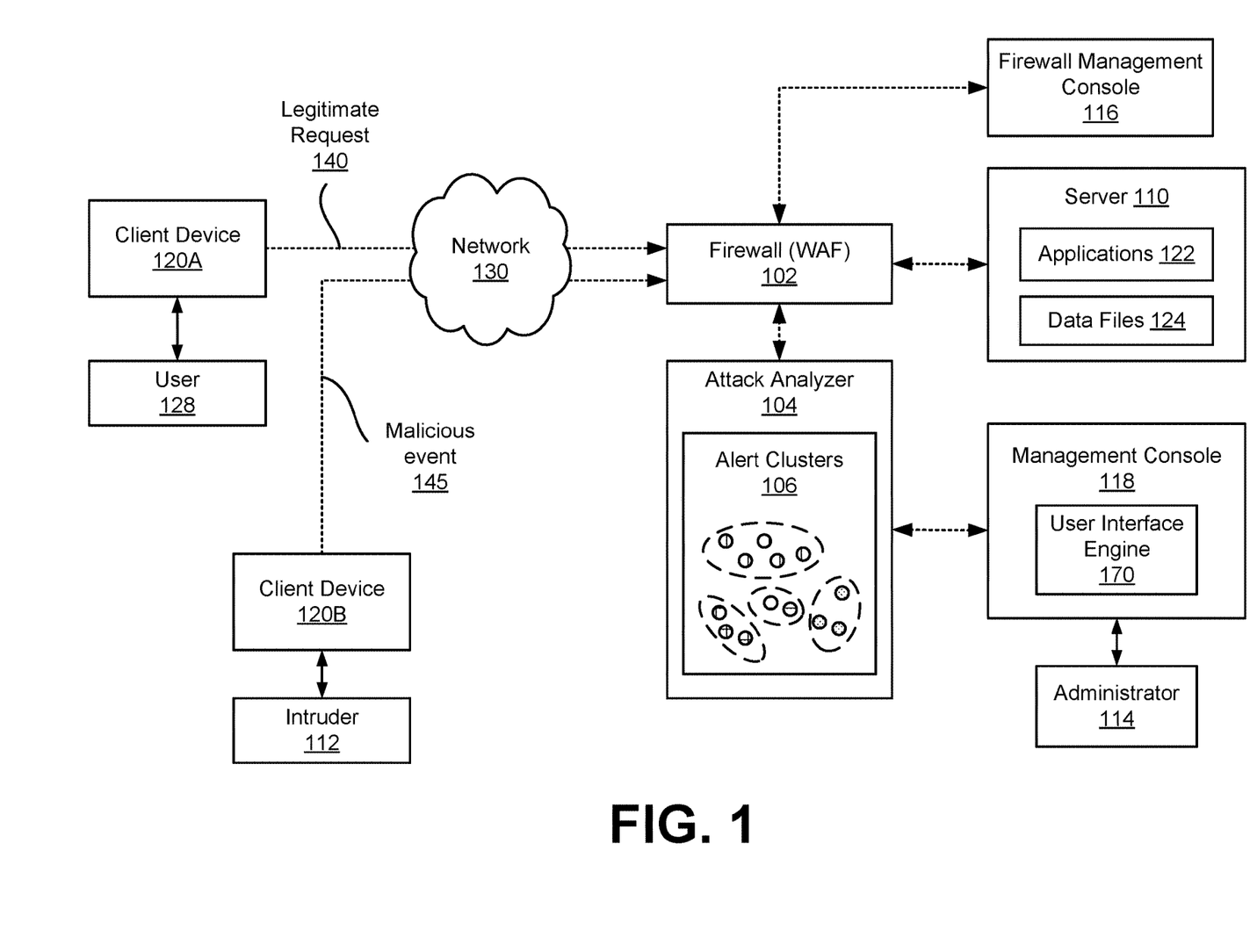
FIG. 1 illustrates an entity diagram for use in conjunction with an attack analyzer, according to one embodiment.

FIG. 1 illustrates an entity diagram for use in conjunction with an attack analyzer 104, according to one embodiment. The entity diagram includes the attack analyzer 104, one or more servers 110, and one or more client devices 120 and management consoles connected over a network 130. In alternative configurations, different and/or additional components may be included in the entity diagram. For example, although one server 110, firewall 102, management consoles 116 and 118, and client devices 120A and 120B are shown in FIG. 1, in other embodiments, the entity diagram may include any number of servers 110, firewalls 102, management consoles 116 or 118, or client devices 120.

The servers 110 include one or more systems executed by computing infrastructure or server hardware for different types of functionality, for example web application servers, file servers, database servers, and the like. A web application server may include a web server that delivers web pages upon the request of a client device 120, and may also include an application server that executes procedures of applications 122, e.g., a web application. Web applications include one or more files of computer code that run on web application servers. Further, web applications may generate content, e.g., in Hypertext Markup Language (HTML) or another suitable language, responsive to requests sent received by client devices 120. The server 110 can execute applications 122 to create, delete, view, or edit data files 124 that are stored locally or on another system.

The client devices 120 are one or more computing devices capable of receiving user or non-user (e.g., from another device or software) input (e.g., from a user 128) as well as transmitting and/or receiving data via the network 130. The client device 120 (e.g., running a client application) may be an electronic device such as a smartphone, tablet computer, desktop computer, laptop computer, or another suitable type of device that can access content or services provided by a server 110. Client devices may be used by different types of users. In the example shown in FIG. 1, a user 128 uses client device 120A to send a legitimate request to the server 110 and the intruder 112 uses the client device 120B to generate a malicious event 145. The client device 120 can present information, for instance, the client device 120 renders web application data from a server 110 using a web browser. The client device 120A may present the web application data to a user 128.

An intruder 112 may attempt to attack or expose a vulnerability of the network infrastructure. In the example illustrated in FIG. 1, the intruder 112 may attempt to compromise the server 110 by generating a malicious event 145 such as a distributed denial-of-service (DDoS), injection, cross site scripting, Hypertext Transfer Protocol (HTTP) request, or another type of request that can be run or executed by a server. Responsive to receiving the malicious attack or request from the client device 120B of the intruder 112, a server 110 may install malware and/or execute the request that in turn compromises the server or makes the server become unavailable.

The firewall 102, for example, a web application firewall (WAF), detects malicious events from client devices 120 and generates information such as alerts describing the detected events to inform an administrator 114 (e.g., security manager) regarding security of the system. Client devices 120 may be associated with one or more users 128 (or intruders 112), for example, a personal mobile phone owned by an individual. In some embodiments, a client device 120 may be shared (e.g., a public computer) or not associated with any specific individual. As used herein, a malicious event may correspond to a malicious attack or request, other types of unwanted applications, an attack on the system, or any event associated with an undesirable effect on the system. Additionally, "alerts" and "malicious events" may be used interchangeably herein, as each alert has a corresponding malicious event that has been detected by the firewall 102.

A firewall 102 may also be referred to as a sensor, detector, or security gateway. The firewall 102 serves as an interface between the client devices 120 and servers 110. Responsive to receiving requests from the client devices 120, the attack analyzer 104 routes the requests to the appropriate server 110 and receives information in response to the requests. For instance, the client device 120A provides a legitimate request 140 for a web application service from the server 110. The attack analyzer 104 determines whether the received information from client devices 120 is a legitimate request (e.g., authorized device or data) or potentially a malicious event. Based on policy from the attack analyzer 104 or management console 118, the firewall 102 may block or allow traffic between a client device 120 and server 110. In the example illustrated in FIG. 1, the attack analyzer 104 determines that client device 120A provides a legitimate request 140 (e.g., not a malicious event) and client device 120B provides a request associated with a malicious event 145. Based on determination by the attack analyzer 104, the firewall 102 allows the legitimate request 140, but not the malicious event 145, to be routed to the server 110.

The management console 118 (which may also be referred to as a management module) may be used to control or configure the attack analyzer 104. A management module may include hardware, software, or any combination thereof. In addition, the management console 118 may present to an administrator 114 information or metrics describing malicious events detected by the firewall 102. Responsive to the detection of the malicious event 145, an attack analyzer 104 processes the malicious event 145. In particular, the attack analyzer 104 may aggregate information describing the malicious event 145 with alert clusters 106, which are based on previously detected or known malicious events, or a batch of malicious events. In some embodiments, the attack analyzer 104 includes a cluster database to store clusters of malicious events. In other embodiments, the attack analyzer 104 accesses a cluster database of another component in the system to retrieve clusters. Additionally, the attack analyzer 104 may access malicious events from the cloud (e.g., a separate server). In some embodiments, the attack analyzer 104 clusters malicious events from multiple customers, e.g., detected by different firewalls of each customer. Additionally, the attack analyzer 104 can generate and send an alert indicating the malicious event 145 to the administrator 114.

The network 130 may comprise any combination of local area and/or wide area networks, using both wired and/or wireless communication systems. In one embodiment, the network 130 uses standard communications technologies and/or protocols, e.g., Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XMIL). In some embodiments, all or some of the communication links of the network 130 may be encrypted using any suitable technique or techniques.

The components shown in FIG. 1 may operate on a server in the cloud or on-premises ("on-prem"), or a combination of both, for example, on a server or another type of computing device at a user site. In one embodiment, the attack analyzer 104 operates on the cloud and the firewall is on-premises. In some embodiments, a server includes a processor for manipulating and processing data, and a storage medium for storing data. The storage medium may include both volatile memory (e.g., random access memory) and non-volatile storage memory such as hard disks, flash memory, and external memory storage devices. In various embodiments, the storage medium comprises a non-transitory computer-readable storage medium. Various executable programs are each embodied as computer-executable instructions stored to the non-transitory computer-readable storage medium. The instructions when executed by the processor cause the corresponding component (e.g., attack analyzer 104 or firewall 102) to perform the functions attributed to the programs described herein.

As described above, the firewall 102 detects malicious events from client devices 120 and to servers 110. The firewall 102 is a network security system that protects data files 124 and/or applications 122 executing on servers 110 (or client devices 120) by controlling or detecting the flow of network traffic across components connected to the network 130. By analyzing transmitted packets and determining whether those packets should be allowed to continue traveling through the network 130, the management console 118 may configure the firewall 102 to prevent unauthorized data associated with a malicious event from reaching a server 110 or a client device 120, generate an alert, or trigger another responsive event such as notifying an administrator 114 of the detection of the malicious event.

The firewall management console 116 controls the firewall 102. In some embodiments, the firewall management console 116 and the management console 118 are the same console. For instance, one console is used to control the attack analyzer 104 and the firewall 102. In other configurations, the attack analyzer 104 and firewall 102 are located or operated by different entities and thus are controlled using separate management consoles. The firewall management console 116 may access configuration information of one or more firewalls being used by the administrator 114 or another administrator. The configuration information may be generated based on malicious events processed by the attack analyzer 104 or information from a cluster database. The firewall management console 116 can use the configuration information to control the one or more firewalls, e.g., by establishing policies indicating certain traffic to allow or block between client devices 120 and servers 110.

The attack analyzer 104 aggregates information describing malicious events detected by the firewall 102. In some embodiments, the attack analyzer 104 maintains a cluster database that stores SDOs describing clusters of previously detected and analyzed malicious events. The attack analyzer 104 may use one or more types of functions to determine aggregate alerts of malicious events. In some embodiments, the attack analyzer 104 does not assume spatial data when aggregating alerts. The attack analyzer 104 functions may calculate a distance (e.g., non-Euclidean distance) between features of malicious events or clusters. Responsive to determining that one or more distances are less than a threshold distance, the attack analyzer 104 may determine that the corresponding malicious events are similar enough to be aggregated in a same cluster.

In some embodiments, the management console 118 includes a user interface engine 170. The user interface engine 170 generates information describing the SDOs maintained by the attack analyzer 104 for presentation to one or more administrators 114. The user interface engine 170 may generate graphical user interfaces to display the information or present the information in any other suitable manner on user interfaces for an administrator 114. For example, the user interface engine 170 sends notifications or alerts of detected malicious events in real-time for display, reports of aggregated alerts on a periodic basis, or metrics describing clusters or aggregated malicious event information. In some embodiments, the information presented by the user interfaces provide transparency describing operation of the attack analyzer 104 "under the hood." In other words, the information may provide context indicating types of malicious events that are detected and remediated by the attack analyzer 104, and indicating how the attack analyzer 104 is categorizing or classifying groups of alerts.

Figure 2:
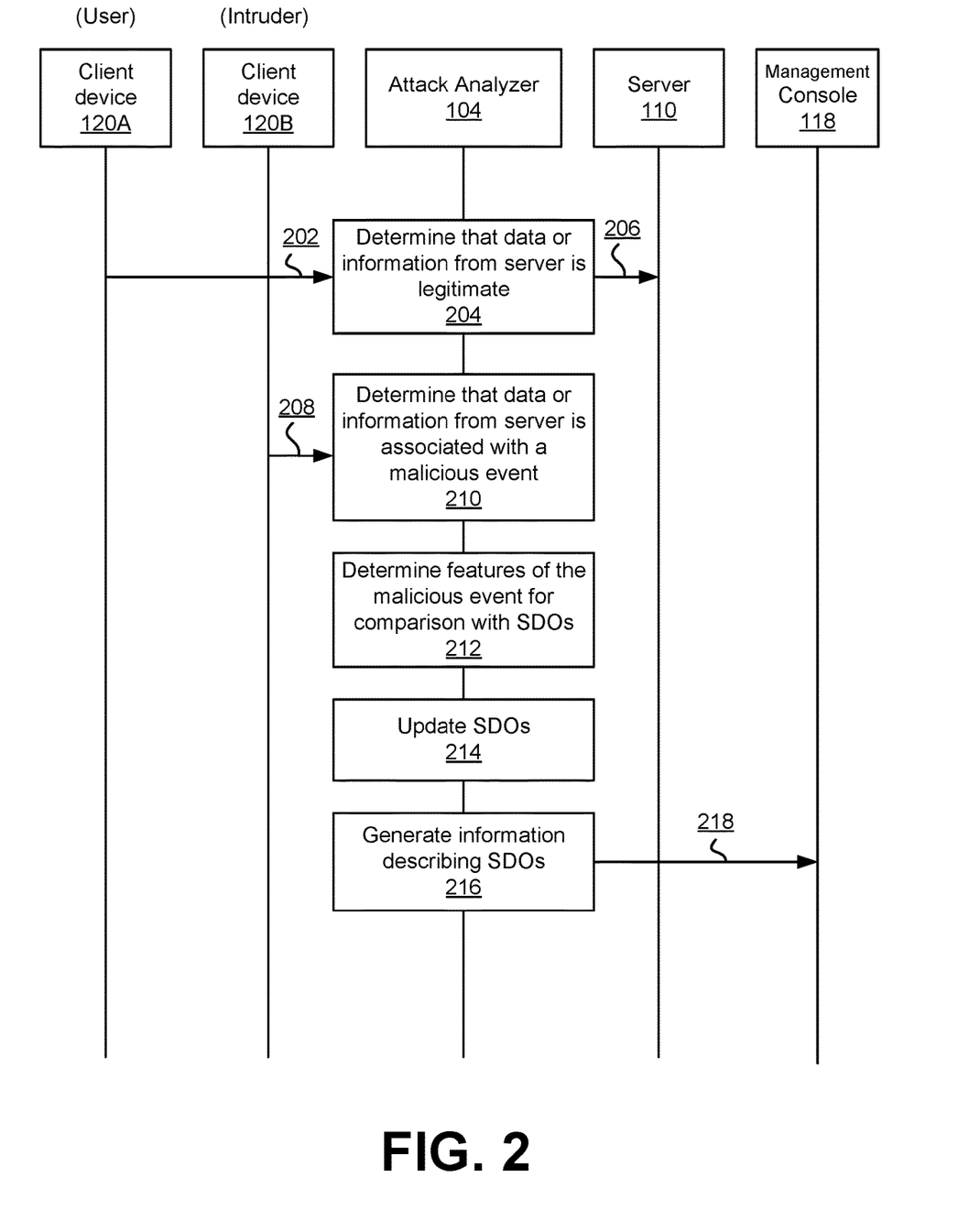
FIG. 2 illustrates sequence diagram for processing malicious event information by an attack analyzer, according to one embodiment.

FIG. 2 illustrates sequence diagram for processing malicious event information by the attack analyzer 104, according to one embodiment. The attack analyzer 104 receives 202 data from the client device 120A of the user 128 (e.g., as shown in FIG. 1) and determines 204 that the data or information is legitimate or authorized. Responsive to this determination, the attack analyzer 104 sends 206 the data (e.g., legitimate request 140 of FIG. 1) to the server 110. The attack analyzer 104 receives 208 additional data from the client device 120B of the intruder 112 and determines 210 that the additional data or information is associated with a malicious event (e.g., malicious event 145 of FIG. 1).

Responsive to detecting the malicious event, the attack analyzer 104 determines 212 features of the malicious event for comparison with statistical distribution objects (SDOs). The statistical distribution objects are data structures that describe alerts of previously detected malicious events. The alerts may be associated with one more features of the previously detected malicious events. In addition, the statistical distribution objects may store information describing malicious events clustered by the attack analyzer 104 based on common or similar features. Example features of a malicious event include its origin (e.g., IP address or Autonomous System Number (ASN), country or geographical region, serial number or identifier, or anonymous source such as a Tor network), type of attack (e.g., SQL injection, denial-of-service, scripting, improper resource access, backdoor, remote file inclusion, comment spam, bots, etc.), target (e.g., webpage universal resource locator (URL), file type, or metadata attributes), time of attack (e.g., date or time of day), or type of tool (e.g., user agent, spam generator, web browser, or security application), among other suitable categories of features.

In some embodiments, SDOs store statistics describing clusters of the malicious events, e.g., instead of storing all raw data of the malicious events, which reduces storage requirements or allows for data compression. Each attribute of an SDO may be a dictionary having classifications and associated values. For instance, out of a total of 100 alerts, 60 originated from the United States ("US"), 20 originated from Russia ("RU"), and 20 originated from Israel ("IL"). A SDO may represent these statistics using a data structure ("US": 60, "RU": 20, "IL": 20) for an attribute or feature indicating country of origin.

The attack analyzer 104 updates 214 the SDOs based on a comparison of the features of the detected malicious event with the SDOs. In some embodiments, the attack analyzer 104 performs the update by aggregating an alert of the detected malicious event with an existing cluster of alerts of the previously detected malicious events. The attack analyzer 104 may also update the SDOs by creating a new cluster of alerts that aggregates a new alert with one or more other alerts of previously detected malicious events. The attack analyzer 104 generates 216 information describing the SDOs and transmits 218 the information for presentation to the administrator 114 (e.g., shown in FIG. 1), e.g., on a user interface of a computer or another type of client device. The information may be a notification or alert of the detected malicious event and may include context based on the updated SDOs. For instance, the information indicates that the detected malicious event shares at least one feature with a certain cluster of previous alerts. Based on the information, a user or the attack analyzer 104 may take action to improve security of the system, e.g., automatically update the firewall 102 to protect other servers 110 (or client devices 120) from receiving services or data from a source of the malicious event, remediate servers 110 already impacted by the malicious event, warn other servers 110 or administrators 114 about the malicious event, block a client device 120 identified as potentially compromised by an intruder 112, temporarily restrict access over the network 130, or quarantine affected components of the system.

Example Clusters

Figure 3A:
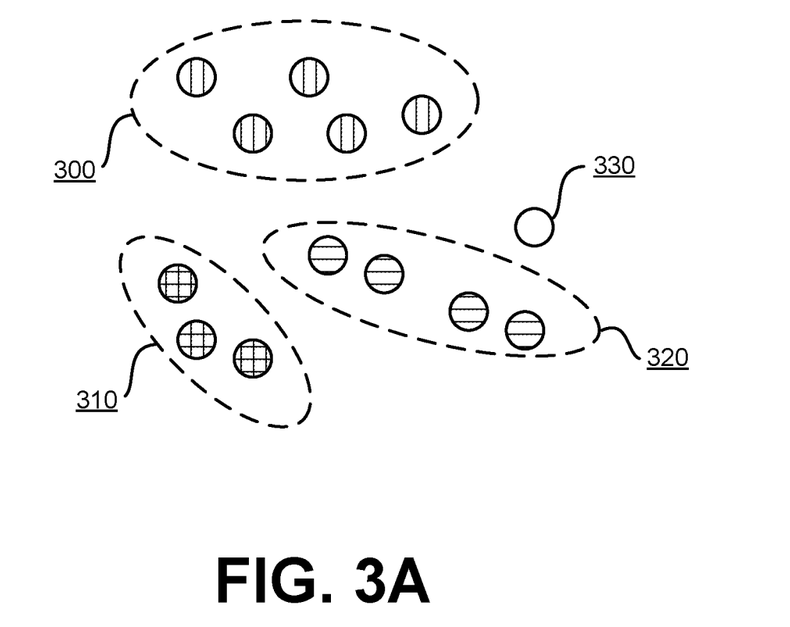
FIG. 3A illustrates clusters of detected malicious events, according to one embodiment.

FIG. 3A illustrates clusters of detected malicious events, according to one embodiment. In the illustrated example, the attack analyzer 104 clustered alerts of previously detected malicious events into a first cluster 300, second cluster 310, and third cluster 320. Each of the clusters represents a group of similar alerts. For instance, the alerts from the first cluster 300 are associated with malicious events that originated from a same user-agent or IP address; the alerts from the second cluster 310 are associated with malicious events that target the same resource; the alerts from the third cluster 320 are associated with malicious events that originated from a particular geographical location, e.g., a country. The attack analyzer 104 may have generated the clusters 300, 310, and 320 in a batch clustering mode. That is, the attack analyzer 104 accumulated a batch of alerts over a period of time before clustering them into their respective one of clusters 300, 310, and 320.

Responsive to detecting the malicious event, the attack analyzer 104 generates an alert 330 indicating the malicious event and determines how to aggregate the alert 330 with the existing clusters 300, 310, and 320. By comparing distances or relationships between features of the alert 330 and features of alerts of the existing clusters, the attack analyzer 104 determines that the alert 330 has a certain level of similarity to alerts of the third cluster 320. Accordingly, the attack analyzer 104 may aggregate the alert 330 with the third cluster 320, in some embodiments.

Figure 3B:
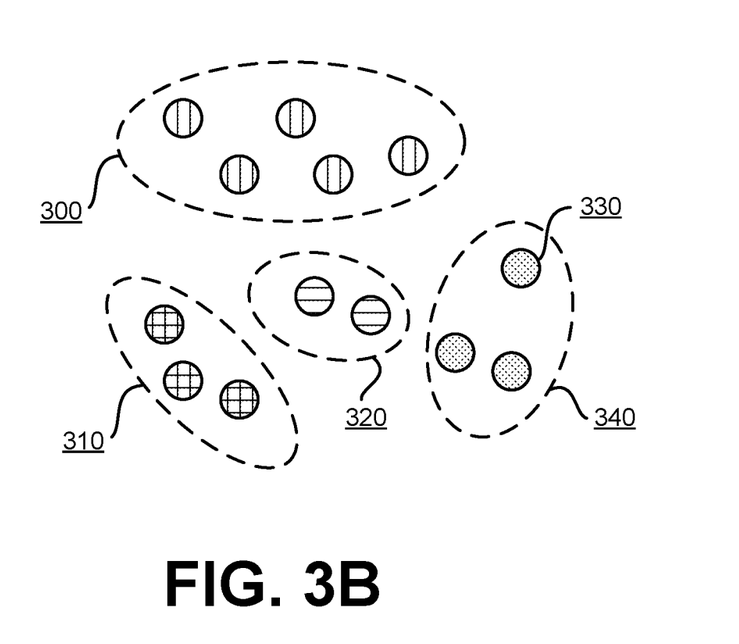
FIG. 3B illustrates a modified version of the clusters shown in FIG. 3A, according to one embodiment.

FIG. 3B illustrates a modified version of the clusters shown in FIG. 3A, according to one embodiment. The attack analyzer 104 may update the SDOs by generating a new cluster, which may also involve splitting an existing cluster. In the illustrated example, the attack analyzer 104 determines that the alert 330 is more similar to a subset of the alerts in the third cluster 320. Thus, the attack analyzer 104 creates a new fourth cluster 340 including the alert 330 and the subset of alerts. The attack analyzer 104 splits the third cluster 320, which in effect moves the subset of alerts from the third cluster 320 to the fourth cluster 340. As an example use case, the attack analyzer 104 determines that the alert 330 and the subset of alerts (of the fourth cluster 340) originated from a specific city located within a country and that the remaining alerts in the third cluster 320 originated from a different city within the country. Accordingly, the attack analyzer 104 updates the SDOs to provide further granularity regarding the geographical locations origins from which malicious events originated.

In some embodiments, the attack analyzer 104 may determine to split a cluster responsive to determining that the cluster includes at least a threshold number of alerts. The threshold number may be based on one more criteria such as a certain function (e.g., splitting clusters of sizes equal to a power of two such as 4, 8, 16, etc.) or memory storage constraints or attributes of a cluster database. The attack analyzer 104 may update SDOs in a streaming mode, for example, modifying clusters in real-time as new alerts are processed.

Example Process Flows

Figure 4:
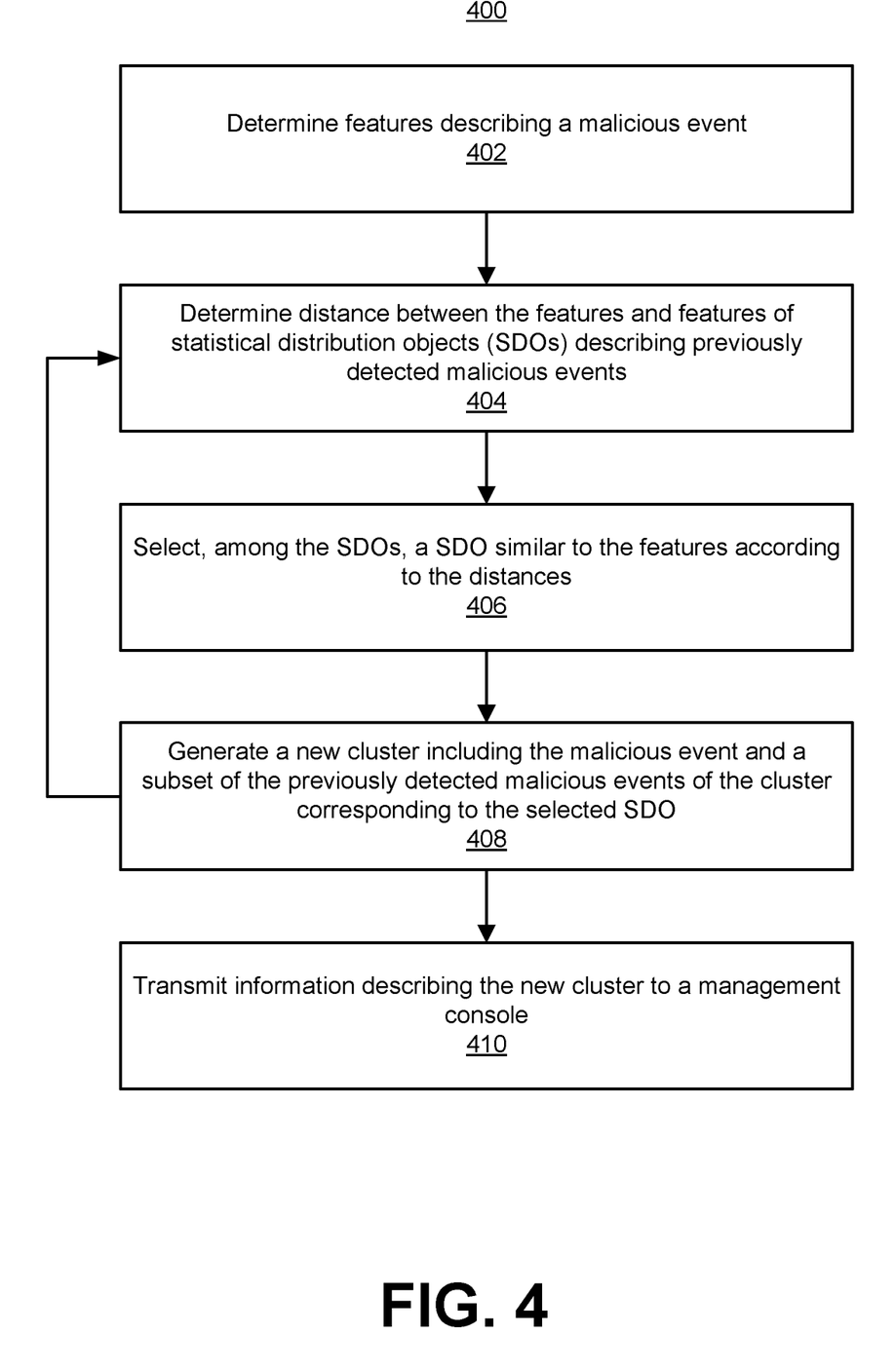
FIG. 4 illustrates a process flow for processing malicious event information by an attack analyzer, according to one embodiment.
Figure 5:
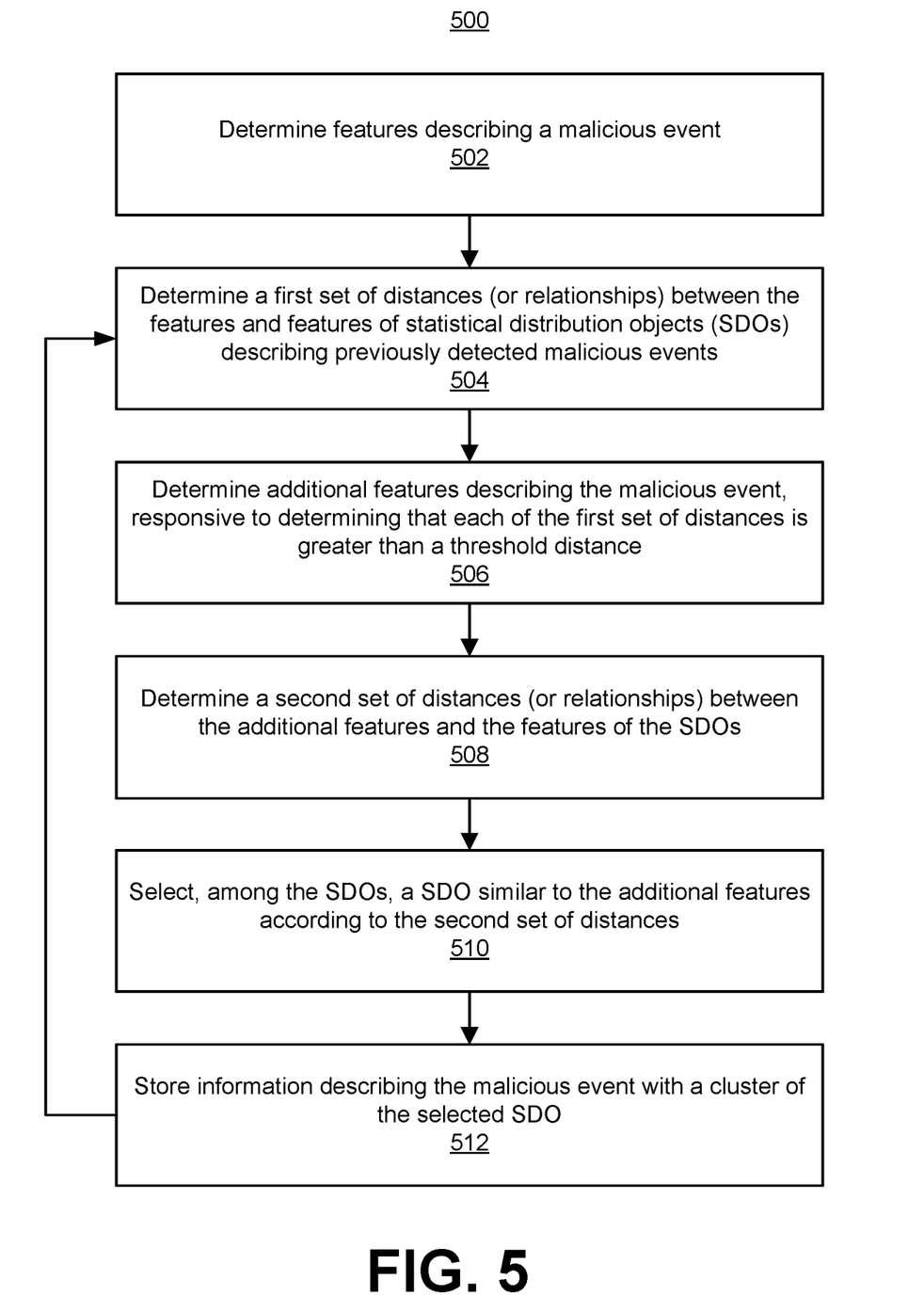
FIG. 5 illustrates a process flow for processing malicious event information using at least two functions, according to one embodiment.
Figure 6:
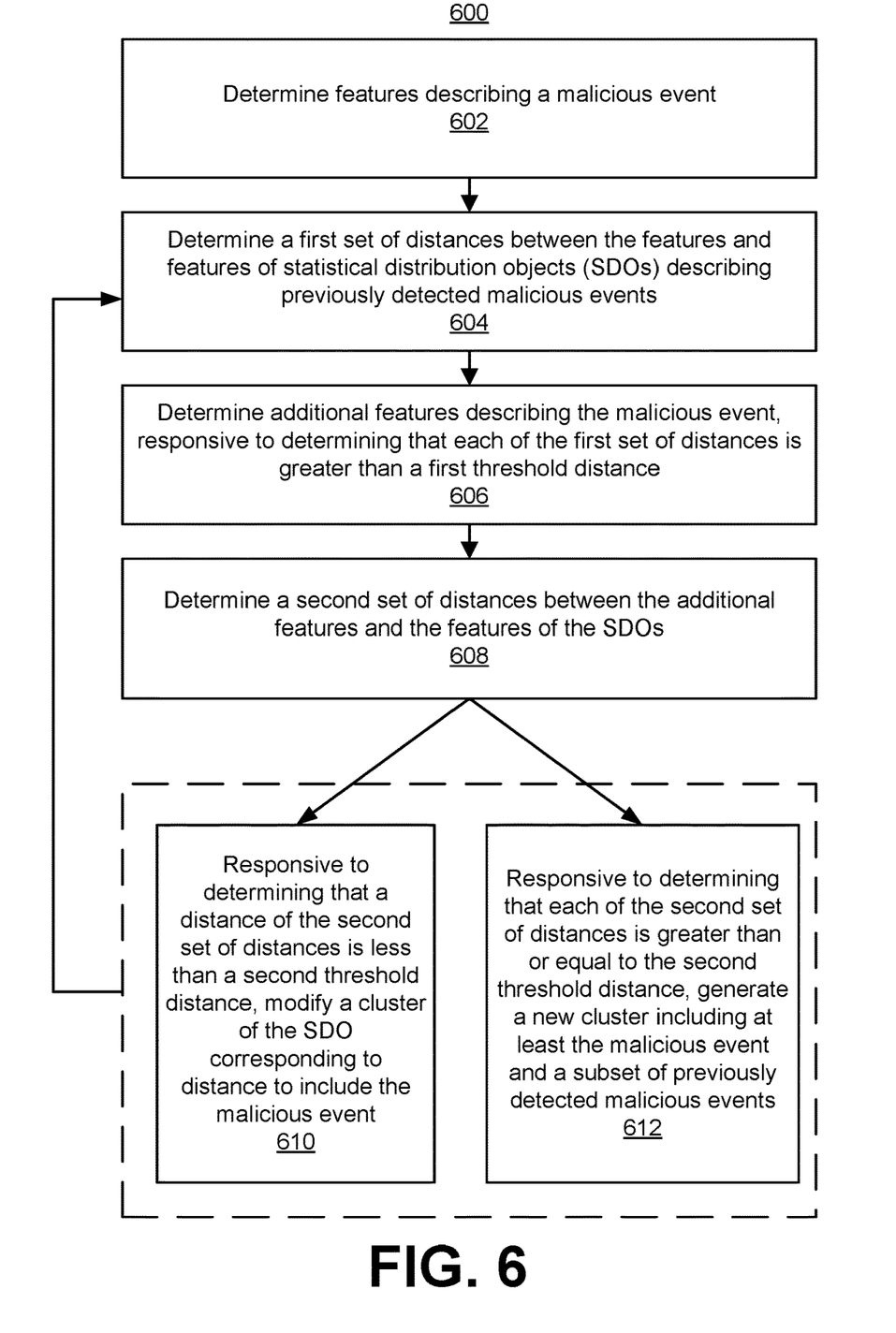
FIG. 6 illustrates a process flow for generating a new cluster describing a malicious event, according to one embodiment.

The attack analyzer 104 may use the process flows shown in FIGS. 4-6 to analyze malicious events such as those detected in 210 of the sequence diagram previously described with respect to FIG. 2. The process flows outlined below also describe various methods for updating SDOs, e.g., performed in 214 of the sequence diagram of FIG. 2. Particularly, process flow 400 of FIG. 4 may be used to generate new clusters including alerts of newly detected malicious objects. The process flow 500 of FIG. 5 may be used to determine features of malicious events or SDOs using at least two distance functions, e.g., performed in 212 of the sequence diagram of FIG. 2. The process flow 600 of FIG. 6 may be used to determine whether to update SDOs by adding a new alert to an existing cluster.

FIG. 4 illustrates a process flow 400 for processing malicious event information by the attack analyzer 104, according to one embodiment. The attack analyzer 104 determines 402 a set of features describing a malicious event detected by a firewall 102. In some embodiment, the attack analyzer 104 uses an enrichment function to extract features from raw data of malicious events. For example, the attack analyzer 104 uses an enrichment function to clean a target URL of an attack (e.g., using a regular expression for truncation of the URL string), and extracts features such as a resource extension, suffix folder, or pattern of the URL. As another example, the attack analyzer 104 may extract the country or geographical region or origin from an IP address of an attack, or determine whether the IP address is associated with an anonymous proxy or network.

The attack analyzer 104 determines 404 distances or relationships between the set of features and features of each statistical distribution object in a set. The statistical distribution objects describe clusters of previously detected malicious events (or alerts of malicious events). The attack analyzer 104 selects 406, among the set of statistical distribution objects, a statistical distribution object having certain features similar to the set of features according to the distances. The attack analyzer 104 generates 408 a new cluster including at least the malicious event and a subset of the previously detected malicious events of the cluster corresponding to the selected statistical distribution object (e.g., the updated clusters shown in FIG. 3B). The attack analyzer 104 may repeat steps 404-408 to process any number of newly detected malicious events and update the SDOs to aggregate alerts of those detections. By repeating the steps, the attack analyzer 104 may use information from past alerts as feedback for determining features of subsequent malicious events.

The attack analyzer 104 transmits 410 information describing the new cluster to a management console 118 for presentation on a user interface. The information may indicate features of the new cluster such as a newly detected origin geographical location or tool associated with malicious events. The information may also notify an administrator regarding the update to the SDOs or the generation of the new cluster. In various embodiments, the attack analyzer 104 operates in a streaming mode, where alerts for malicious events are processed one at a time as they are detected, rather than as a batch of alerts. Additionally, the clusters may be adaptive or have dynamic descriptions. That is, the attack analyzer 104 may tag clusters with relevant contextual tags, as well as change the tags over time as the alerts within a cluster are updated, for instance, due to newly generated clusters, merged clusters, or split clusters.

In some embodiments, the transmitted information describing the new cluster indicates a new attack type. The new attack types is discovered by analyzing features of detected malicious events in a previously created cluster. The attack analyzer 104 may create new rules based on correlated or recurring clusters. For instance, an attack type may target a specific type of vulnerability of the network infrastructure or its components or exhibit a particular pattern. Example patterns include temporal patterns across attack timestamps, patterns in the attacker's tool or source or signatures in program code, e.g., for a SQL injection attack. After the rules are added to the firewall, new clusters may be formed based on the new rules. In some embodiments, this process is repeated recursively.

FIG. 5 illustrates a process flow 500 for processing malicious event information using at least two functions, according to one embodiment. As previously described, the attack analyzer 104 may use a multi-stage (e.g., two-stage) distance function to efficiently process and ingest new alerts of malicious events into SDOs. The process flow 400 of FIG. 4 does not necessarily require the use of more than one distance function for determining features. The attack analyzer 104 determines 502 a set of features describing a malicious event detected by a firewall 102. The attack analyzer 104 determines 504 a first set of distances using a first distance function and the set of features. The first set of distances indicate levels of similarity between the set of features and features of each of a set of statistical distribution objects. The statistical distribution objects describe clusters of previously detected malicious events (or alerts of the malicious events).

Responsive to determining that each of the first set of distances is greater than a threshold distance, the attack analyzer 104 determines 506 additional features describing the malicious event. The attack analyzer 104 determines 508 a second set of distances using a second distance function and the additional features. The second set of distances indicate levels of similarity between the additional features and the features of each of the set of statistical distribution objects. The attack analyzer 104 selects 510, among the set of statistical distribution objects, a statistical distribution object having certain features similar to the additional features according to the second set of distances. The attack analyzer 104 stores 512 information describing the malicious event with a cluster of the selected statistical distribution object. In some embodiments, responsive to determining that one of the first set of distances is less than or equal to the threshold distance, the attack analyzer 104 may proceed to step 510 using the first set of distances instead of the second set of distances. The attack analyzer 104 may repeat steps 504-512 for any number of newly detected malicious events to process the malicious events using the first and second distance functions.

As shown by the process flow 500 in FIG. 5, the attack analyzer 104 may use a multi-stage (e.g., two-stage) approach to process alerts of detected malicious events. In some embodiments, the attack analyzer 104 performs pre-processing in a first stage to group or cluster malicious events prior to a second stage. In some embodiments, the attack analyzer 104 uses a first distance function to determine whether two malicious events should be clustered together during the first stage for pre-processing. The first distance function may use a specific set of features indicating an IP address of an attack and a tool used to execute the attack. In a different embodiment for pre-processing, the attack analyzer 104 groups malicious events based on common features (e.g., IP address or attack source) between the malicious events, rather than using a distance function. In a second stage, the attack analyzer 104 uses a second distance function, which may calculate levels of similarity between additional features of malicious events or alerts.

The first distance function may be limited or less accurate than the second distance function in determining whether the two malicious events should be clustered separately. However, the second distance function requires additional features (e.g., beyond the specific set of IP address and tool described by a user agent), so the attack analyzer 104 requires more time to process alerts using the second distance function, in comparison to using the first distance function. In some embodiments, the first distance function is not necessarily a non-Euclidean distance function. Thus, the first distance function may use less computational resources relative to the second (e.g., non-Euclidean) distance function. By using the second distance function when the output of the first distance function is limited or not conclusive for clustering alerts, the attack analyzer 104 improves the efficiency of its algorithm to enable processing of larger volumes of detect malicious events. In some embodiments, the attack analyzer 104 triages processing of detected malicious events by using the first distance function for less sophisticated attacks and using the second distance function for a deeper analysis or attacks that are more advanced or less familiar to the attack analyzer 104.

Conventional methods may use Euclidean distance functions to determine Euclidean distances between two points, i.e., a straight line distance between two points A and A'. For example, in 2D Cartesian space, the Euclidean distance may be determined using the Pythagorean formula. Euclidean distances may be a typical approach to quantify relationships between points using numerical values. However, Euclidean distance functions may not be able to, or cannot meaningfully, measure qualitative features of events or other types of objects.

In various embodiments, the first and/or second distance functions are non-Euclidean distance functions. Non-Euclidean distance functions provide a qualitative approach to determine relationships between events that can be based on different features, characteristics, actual data observed, domain knowledge, or mappings to distance functions. The non-Euclidean distance functions are used to calculate a non-Euclidean distance between features (such as IP addresses) rather than calculating a spatial or Euclidean distance between the features. In contrast to Euclidean distance functions that apply transformations based on numerical values of features, the non-Euclidean distance functions may take into account other latent properties or qualitative characteristics of data, e.g., similar patterns between strings or other types of data structures not limited to numerical values. For example, a non-Euclidean approach may be used to determine that multiple IP addresses are from the same country or another geographical location. In some embodiments, non-Euclidean distance functions may involve any suitable combination of numerical and non-numerical values, which would not be feasible using a Euclidean distance function. In addition, non-Euclidean distance functions may determine distances in non-2D space such as in spherical or hyperbolic space, and the distances may be curved instead of being a straight line between two points. In some embodiments, non-Euclidean distances may indicate dissimilarity of features in one, two, three, or more dimensions. In some embodiments, using a Non-Euclidean approach, the attack analyzer 104 may mathematically model the relationship between malicious events and map the relationship to one or more types of functions (e.g., Non-Euclidean functions).

Moreover, the attack analyzer 104 may combine distances calculated for multiple features using a weighted average or sum across the set of features. Different features may be assigned to particular weights that are determined by security experts or learned by a model based on training data including features of previously detected malicious events. For instance, weights for geographical location origin of a malicious events may be greater than weights for types of tool associated with the malicious events. The attack analyzer 104 may update steps of the process flow 500 in a modular fashion. For example, one of the first or second distance function may be modified without necessarily requiring modification of the other.

FIG. 6 illustrates a process flow 600 for generating a new cluster describing a malicious event, according to one embodiment. As previously described, process flow 400 of FIG. 4 describes an embodiment where SDOs are updated by generating a new cluster. The process flow 600 allows the attack analyzer 104 to determine whether to generate a new cluster or merge a new alert into an existing cluster. The attack analyzer 104 determines 602 a set of features describing a malicious event detected by a firewall 102. The attack analyzer 104 determines 604 a first set of distances using a first distance function and the set of features. The first set of distances indicate levels of similarity between the between the set of features and features of each of a set of statistical distribution objects. The statistical distribution objects describe clusters of previously detected malicious events.

Responsive to determining that each of the first set of distances is greater than a first threshold distance, the attack analyzer 104 determines 606 additional features describing the malicious event. The attack analyzer 104 determines 608 a second set of distances using a second distance function and the additional features. The second set of distances indicate levels of similarity between the between the additional features and the features of each of the set of statistical distribution objects.

Responsive to determining that a distance of the second set of distances is less than a second threshold distance, the attack analyzer 104 modifies 610 a cluster of the statistical distribution object corresponding to the distance to include the malicious event. Referring to the example previously illustrated in FIG. 3A, the attack analyzer 104 may modify SDOs by including the alert 330 of the malicious event with one of the clusters 300, 310, and 320. In some embodiments, responsive to determining that one of the first set of distances is less than or equal to the first threshold distance, the attack analyzer 104 may proceed to step 610 using the first set of distances instead of the second set of distances.

Responsive to determining that each of the second set of distances is greater than or equal to the second threshold distance, the attack analyzer 104 generates 612 a new cluster including at least the malicious event and a subset of the previously detected malicious events of one of the clusters. Referring to the example previously illustrated in FIG. 3B, the attack analyzer 104 may modify SDOs by generating the new cluster 340 including the alert 330 of the malicious event and a subset of the previously detected malicious events of cluster 320. The attack analyzer 104 may remove the subset of malicious events (added to the new cluster 340) from the cluster 320. The attack analyzer 104 may repeat steps 604-612 for any number of newly detected malicious events to process the malicious events using the first and second distance functions and update the SDOs.

Figure 7:
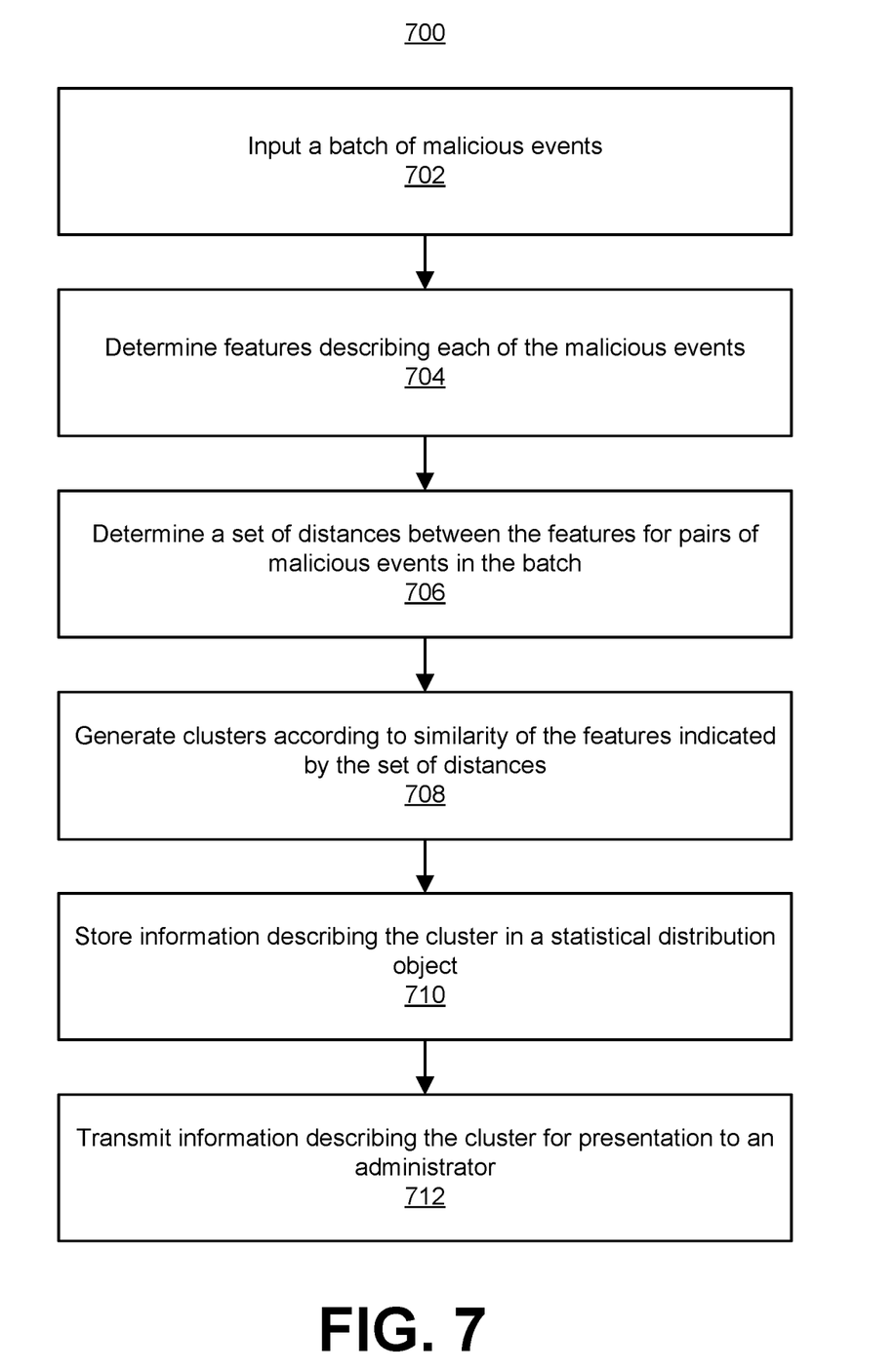
FIG. 7 illustrates a process flow for batch clustering of malicious events, according to one embodiment.

FIG. 7 illustrates a process flow for batch clustering of malicious events, according to one embodiment. The attack analyzer 104 receives 702 as input a batch of malicious events detected by the firewall 102. In some embodiments, the attack analyzer 104 does not have alert clusters 106 (e.g., as shown in FIG. 1) before processing malicious events in batch mode. In other embodiments, the attack analyzer 104 may process malicious events in batch mode to update existing clusters.

The attack analyzer 104 determines 704 features describing each of the malicious events. The attack analyzer 104 determines 706 a set of distances between the features for pairs of malicious events in the batch. The distances may be determined using a non-Euclidean distance function. In some embodiments, the attack analyzer 104 iterates through each possible pairing of malicious events in the batch. In some embodiments, instead of pairs, the attack analyzer 104 may determine distances between three or more malicious events. The attack analyzer 104 generates 708 clusters according to similarity of the features indicated by the set of distances. For example, responsive to determining that malicious events that have at least a threshold similarity to each other as indicated by a corresponding one of the distances, the attack analyzer 104 groups the malicious events in a same cluster. Additionally, the attack analyzer 104 may dynamically update clusters as more malicious events are processed according to their associated features and distances.

The attack analyzer 104 stores 710 information describing the cluster in a SDO. The stored information may be used by the attack analyzer 104 at a later time to process new malicious events in a streaming mode, e.g., using the processes shown in FIGS. 4-6. The attack analyzer 104 transmits 712 information describing the cluster for presentation to an administrator.

Figure 8:
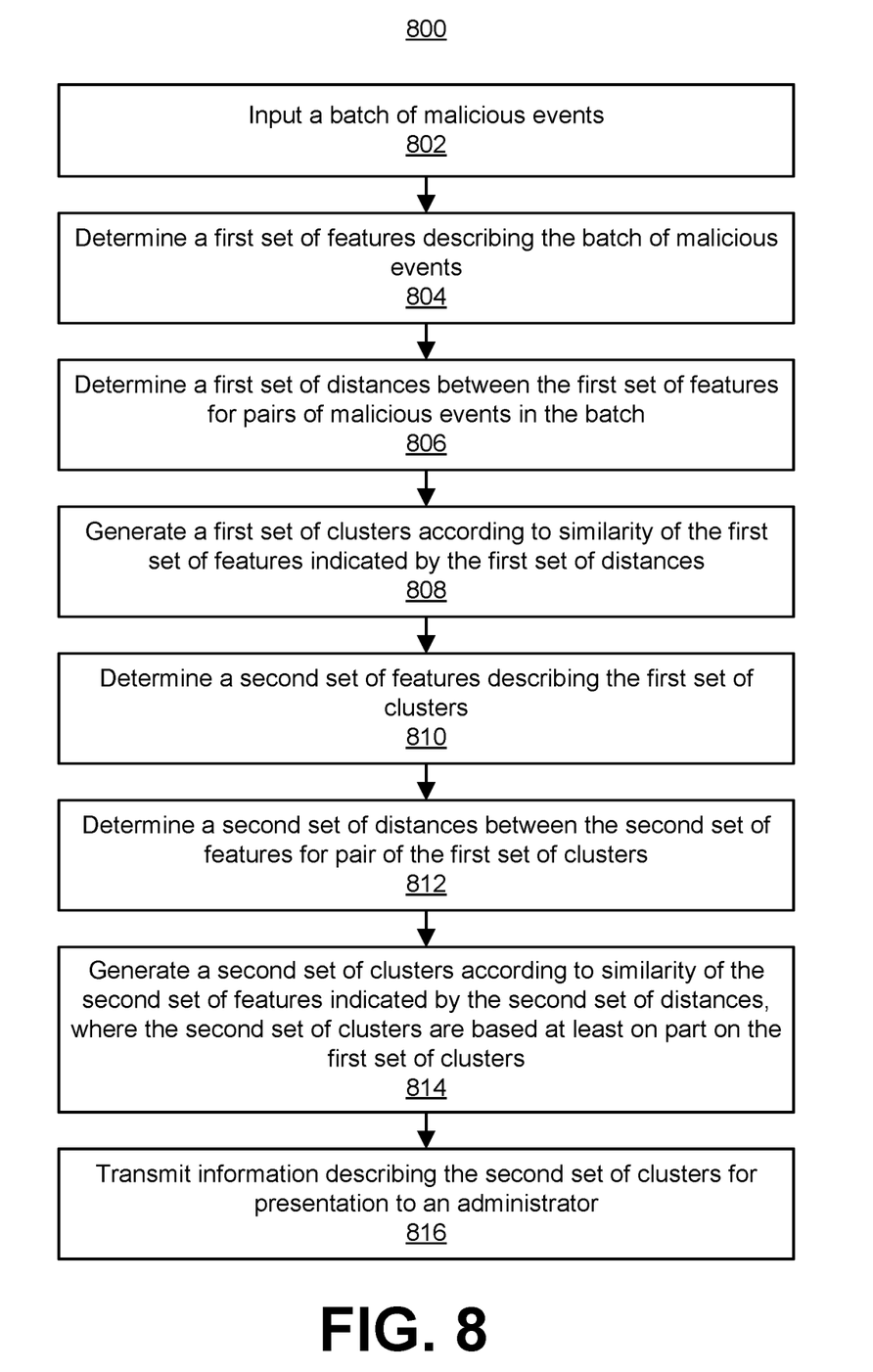
FIG. 8 illustrates another process flow for batch clustering of malicious events, according to one embodiment.

FIG. 8 illustrates another process flow for batch clustering of malicious events, according to one embodiment. The attack analyzer 104 receives 802 as input a batch of malicious events detected by the firewall 102. The attack analyzer 104 determines 804 a first set of features describing each of the malicious events. The attack analyzer 104 determines 806 a first set of distances between the first set of features for pairs (or any other number) of malicious events in the batch. The attack analyzer 104 generates 808 a first set of clusters according to similarity of the features indicated by the first set of distances.

The attack analyzer 104 determines 810 a second set of features describing each of the first set of clusters, e.g., and/or the malicious events, features, or distances of the clusters. The attack analyzer 104 determines 812 a second set of distances between the second set of features for pairs (or any other number) of the first set of clusters. In some embodiments, the attack analyzer 104 uses different types of features for the first and second set of features. For example, the second set of features may include additional features not included in the first set of features. Additionally, the attack analyzer 104 may use different types of distance functions to determine the first and second set of distances. One or both of the functions may be a non-Euclidean distance function.

The attack analyzer 104 generates 814 a second set of clusters according to similarity of the features indicated by the second set of distances. The second set of clusters may be a combination of the first set of clusters. For example, the second set of clusters includes at least one cluster generated by merging two or more clusters of the first set, or splitting a cluster of the first set. The second set of clusters may also include a modified version of a previously generated cluster from the first set, e.g., a malicious event is added to or removed from the previously generated cluster. Moreover, the second set of clusters also include new clusters not from the first set, or include at least one cluster from the first set that has not been modified.

In some embodiments, the attack analyzer 104 may store information describing the second set of clusters in a SDO. The stored information may be used by the attack analyzer 104 at a later time to process new malicious events in a streaming mode, e.g., using the processes shown in FIGS.

4-6. The attack analyzer 104 transmits 816 information describing the cluster for presentation to an administrator.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method by a computing device implementing an attack analyzer for processing malicious events detected by a firewall communicatively coupled between clients and a server, wherein the firewall is configured to block requests associated with malicious events from reaching the server or generate an alert describing the requests associated with the malicious events, wherein the firewall is further configured to allow requests that are determined to be legitimate to reach the server, the method comprising:

determining a first set of features describing a malicious event detected by the firewall;

determining a set of distances using a non-Euclidean distance function and the first set of features, the set of distances indicating levels of similarity between the first set of features and a second set of features, wherein the non-Euclidean distance function is used to determine geographic origin similarity between different Internet Protocol (IP) addresses included in the first set of features and second set of features;

generating a statistical distribution object using the set of distances, the statistical distribution object including information describing a cluster that includes at least the malicious event and one or more other malicious events that are determined to be similar to the malicious event in terms of geographic origin;

storing information describing the statistical distribution object; and transmitting information describing the cluster to a management console for presentation to an administrator on a graphical user interface, wherein the information describing the cluster indicates a common geographic origin associated with the malicious events included in the cluster.

2. The method of claim 1, wherein the first set of features describe a plurality of malicious events, wherein the second set of features also describe the plurality of malicious events.

3. The method of claim 1, wherein the second set of features describe clusters of previously detected malicious events.

4. The method of claim 3, further comprising:

determining an additional set of features describing a different malicious event detected by the firewall;

determining an additional set of distances using the non-Euclidean distance function and the additional set of features, the additional set of distances indicating levels of similarity between the additional set of features and other features;
responsive to determining that a distance of the additional set of distances is less than a threshold distance:
modifying another cluster to include the different malicious event; and
responsive to determining that each of the additional set of distances is greater than or equal to the threshold distance:
generating a new cluster including at least the different malicious event and a subset of the previously detected malicious events of one of the clusters.

5. The method of claim 3, further comprising:
updating a different cluster by removing a subset of the previously detected malicious events from the different cluster.

6. The method of claim 3, further comprising:
responsive to generating the statistical distribution object, updating the firewall to protect the server from receiving requests from a source of the malicious event.

7. The method of claim 1, wherein the statistical distribution object is updated in streaming mode as malicious events are detected.

8. The method of claim 1, further comprising:
determining, prior to determining the set of distances using the non-Euclidean distance function, groups of malicious events based at least on common features between the malicious events.

9. The method of claim 1, further comprising:
generating a rule for the firewall by processing a plurality of clusters including at least the cluster; and
modifying the plurality of clusters based on the rule.

10. A method by a computing device implementing an attack analyzer for processing malicious events detected by a firewall communicatively coupled between clients and a server, wherein the firewall is configured to block requests associated with malicious events from reaching the server or generate an alert describing the requests associated with the malicious events, wherein the firewall is further configured to allow requests that are determined to be legitimate to reach the server, the method comprising:
receiving a batch of a plurality of malicious events detected by the firewall;
determining a first set of features describing the plurality of malicious events;
determining a first plurality of distances using a first non-Euclidean distance function, the first plurality of distances indicating levels of similarity between the first set of features of the plurality of malicious events, wherein the first non-Euclidean distance function is used to determine geographic origin similarity between different Internet Protocol (IP) addresses included in the first set of features;
generating a first plurality of clusters according to the levels of similarity indicated by the first plurality of distances, wherein the first plurality of clusters includes a cluster that includes malicious events that are determined to be similar in terms of geographic origin; and
transmitting information describing the first plurality of clusters to a management console for presentation to an administrator on a graphical user interface, wherein the information describing the first plurality of clusters indicates a common geographic origin associated with the malicious events included in the cluster.

11. The method of claim 10, further comprising:
determining a second set of features describing the first plurality of clusters;
determining a second plurality of distances using a second non-Euclidean distance function, the second plurality of distances indicating additional levels of similarity between the second set of features of the first plurality of clusters;
generating a second plurality of clusters according to the additional levels of similarity indicated by the second plurality of distances; and
transmitting information describing the second plurality of clusters to the management console for presentation to an administrator on a graphical user interface.

12. The method of claim 11, wherein generating the second plurality of clusters comprises:
generating a new cluster using at least one cluster of the first plurality of clusters.

13. The method of claim 11, wherein the second plurality of clusters includes at least one cluster different from the first plurality of clusters and at least another cluster in common with the first plurality of clusters.

14. The method of claim 10, further comprising:
determining a weighted sum of the first plurality of distances, the first plurality of clusters generated using the weighted sum.

15. The method of claim 10, wherein determining the first plurality of distances using the first non-Euclidean distance function comprises:
for each pair of malicious events of the plurality of malicious events:
comparing the pair of malicious events using the corresponding features of the first set of features to determine a level of similarity.

16. A computer program product comprising a non-transitory computer readable storage medium having instructions encoded thereon that, when executed by a processor of a computing device implementing an attack analyzer, cause the processor to:
determine a first set of features describing a malicious event detected by a firewall communicatively coupled between clients and a server, wherein the firewall is configured to block requests associated with the malicious event from reaching the server or generate an alert describing the requests associated with the malicious events, wherein the firewall is further configured to allow requests that are determined to be legitimate to reach the server;
determine a set of distances using a non-Euclidean distance function and the first set of features, the set of distances indicating levels of similarity between the first set of features and a second set of features, wherein the non-Euclidean distance function is used to determine geographic origin similarity between different Internet Protocol (IP) addresses included in the first set of features and second set of features;
generate a statistical distribution object using the set of distances, the statistical distribution object including information describing a cluster that includes at least the malicious event and one or more other malicious events that are determined to be similar to the malicious event in terms of geographic origin;
store information describing the statistical distribution object; and
transmit information describing the cluster to a management console for presentation to an administrator on a graphical user interface, wherein the information describing the cluster indicates a common geographic origin associated with the malicious events included in the cluster.

17. The computer program product of claim 16, wherein the first set of features describe a plurality of malicious events, wherein the second set of features also describe the plurality of malicious events.

18. The computer program product of claim 16, wherein the second set of features describe clusters of previously detected malicious events.

19. The computer program product of claim 16, wherein the computer readable storage medium further has instructions encoded thereon that, when executed by the processor, cause the processor to:

determine, prior to determining the set of distances using the non-Euclidean distance function, groups of malicious events based at least on common features between the malicious events.

20. The computer program product of claim 16, wherein the computer readable storage medium further has instructions encoded thereon that, when executed by the processor, cause the processor to:

generate a rule for the firewall by processing a plurality of clusters including at least the cluster; and
   modify the plurality of clusters based on the rule.

* * * * *